United States Patent
Gao et al.

(10) Patent No.: US 12,185,242 B2
(45) Date of Patent: Dec. 31, 2024

(54) USER EQUIPMENT AND CONTROL METHOD THEREFOR, AND COMPUTER READABLE STORAGE MEDIUM

(71) Applicant: BEIJING UNISOC COMMUNICATIONS TECHNOLOGY CO., LTD., Bejing (CN)

(72) Inventors: Xinghang Gao, Shanghai (CN); Zhikun Xu, Shanghai (CN); Sicong Zhao, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 686 days.

(21) Appl. No.: 17/420,961

(22) PCT Filed: Jan. 8, 2020

(86) PCT No.: PCT/CN2020/070870
§ 371 (c)(1),
(2) Date: Jul. 6, 2021

(87) PCT Pub. No.: WO2020/143655
PCT Pub. Date: Jul. 16, 2020

(65) Prior Publication Data
US 2022/0104128 A1    Mar. 31, 2022

(30) Foreign Application Priority Data
Jan. 11, 2019    (CN) .......................... 201910027700.2

(51) Int. Cl.
*H04W 52/02*    (2009.01)

(52) U.S. Cl.
CPC .............................. *H04W 52/0225* (2013.01)

(58) Field of Classification Search
None
See application file for complete search history.

(56) References Cited

U.S. PATENT DOCUMENTS

| 2015/0189627 A1 | 7/2015 | Yang et al. |
| 2017/0048835 A1 | 2/2017 | Kim et al. |

(Continued)

FOREIGN PATENT DOCUMENTS

| CN | 102149208 A | 8/2011 |
| CN | 102158909 A | 8/2011 |

(Continued)

OTHER PUBLICATIONS

EPO Extended European Search Report for corresponding EP Application No. 20738243.3; Mailing Date, Sep. 14, 2022.

(Continued)

*Primary Examiner* — Suhail Khan
(74) *Attorney, Agent, or Firm* — CANTOR COLBURN LLP

(57) ABSTRACT

A user equipment and a control method therefor, and a computer readable storage medium. The method comprises: after configured secondary cells are activated, receiving downlink control information that is transmitted by means of a specific cell; based on the received downlink control information, determining, in the activated secondary cells, the secondary cell that needs to monitor a PDCCH; and over the secondary cell that needs to monitor the PDCCH, monitoring the PDCCH. By applying the scheme, the power consumption of the user equipment can be further reduced.

18 Claims, 3 Drawing Sheets

(56) References Cited

U.S. PATENT DOCUMENTS

| | | | |
|---|---|---|---|
| 2019/0132793 A1* | 5/2019 | Lin | H04W 52/0206 |
| 2019/0207662 A1* | 7/2019 | Zhou | H04W 72/0446 |

FOREIGN PATENT DOCUMENTS

| | | | |
|---|---|---|---|
| CN | 102958073 A | 3/2013 | |
| CN | 103906244 A | 7/2014 | |
| CN | 105991212 A | 10/2016 | |
| CN | 106304281 A | 1/2017 | |
| CN | 106330410 A | 1/2017 | |
| CN | 107534538 A | 1/2018 | |
| CN | 108012289 A | 5/2018 | |
| EP | 2363008 | 9/2011 | |
| EP | 2530961 A1 | 12/2012 | |
| EP | 3110193 A1 | 12/2016 | |
| EP | 3134993 A | 3/2017 | |
| JP | 2017513353 A | 5/2017 | |
| JP | 2018186548 A | 11/2018 | |
| KR | 1020170127022 A | 11/2017 | |
| WO | 2010051209 A1 | 5/2010 | |
| WO | 2011132960 A2 | 10/2011 | |
| WO | 2016149167 A1 | 9/2016 | |
| WO | 2016168342 A1 | 10/2016 | |

OTHER PUBLICATIONS

Ericsson, "Introduction of CA Enhancements in MAC", 3GPP TSG-RAN2 Meeting #78, R2-123091, May 21-25, 2012, 14 pages.

Huawei et al., "Power saving techniques", 3GPP TSG RAN WG1 Meeting #95, R1-1812231, Nov. 12-16, 2018, 7 pages.

JPO Notice of Reasons for Refusal corresponding to JP Application No. 2021-539351; Mailing Date, Oct. 3, 2022.

IPO Korean Office Action corresponding to KR Application No. 10-2021-7024299; Mailing Date, Jul. 18, 2022.

Nokia et al., "On UE adaptation to the traffic", 3GPP TSG RAN WG1 Meeting #95, R1-1813620, Nov. 12-16, 2018, 12 pages.

Nokia et al., "Running CR for euCA Stage-2", 3GPP TSG-RAN WG2 #100, R2-1714289, Nov. 27-Dec. 1, 2017, 6 pages.

ZTE, "On adaptation aspects for Nr Ue power consumption reduction", 3GPP TSG RAN WG1 Meeting #95, R1-1812421, Nov. 12-16, 2018, 10 pages.

International Search Report for International Application No. PCT/CN2020/070870; Dated; Apr. 9, 2020.

* cited by examiner

USER EQUIPMENT AND CONTROL METHOD THEREFOR, AND COMPUTER READABLE STORAGE MEDIUM

CROSS-REFERENCE TO RELATED APPLICATIONS

This is the U.S. national stage of application No PCT/CN2020/070870, filed on Jan. 8, 2020. Priority under 35 U.S.C. § 119(a) and 35 U.S.C. § 365(b) is claimed from Chinese Application No. 201910027700.2, filed Jan. 11, 2019 the disclosure of which is also incorporated herein by reference.

TECHNICAL FIELD

The present disclosure generally relates to communication technology field, and more particularly, to a user equipment and a control method therefor, and a computer readable storage medium.

BACKGROUND

To meet a peak rate requirement of a User Equipment (UE), when the UE has a limited bandwidth, a base station may configure one or more carrier resources for the UE to serve the UE simultaneously, so as to increase the peak rate of the UE.

Specifically, the base station may configure a Secondary Cell (S Cell) to be in an inactive state by default. When the UE's high-rate service arrives, the base station may serve the UE through Media Access Control (MAC) Control Element (CE) or multiple SCells. When the UE's service rate is low, the base station may deactivate one or more activated SCells through the MAC CE.

For activation of the SCell through the MAC CE, the SCell is truly activated after the UE receives the MAC CE and feeds back a Hybrid Automatic Repeat reQuest (HARQ). Afterward, the UE may perform Channel Quality Indication (CQI) measurement and report on the activated SCell. After receiving information of the measurement report, the base station can schedule the UE on the SCell.

In the above process, after the UE feeds back the HARQ, it starts to monitor a Physical Downlink Control Channel (PDCCH) on the activated SCell. If there is no data scheduled on the SCell, the UE monitoring the PDCCH on the activated S Cell may cause relatively high power consumption.

SUMMARY

Embodiments of the present disclosure may reduce power consumption of a UE.

In an embodiment of the present disclosure, a control method for a UE is provided, including: after configured secondary cells are activated, receiving downlink control information sent through a specific cell; based on the received downlink control information, determining, among the activated secondary cells, secondary cells where PDCCH needs to be monitored; and monitoring the PDCCH on the secondary cells where PDCCH needs to be monitored.

Optionally, based on the received downlink control information, determining, among the activated secondary cells, secondary cells where PDCCH needs to be monitored includes: based on a PDCCH monitoring indication field preset in the received downlink control information, determining identifiers of the secondary cells where the PDCCH needs to be monitored among the activated secondary cells, or identifiers of secondary cell groups where the PDCCH needs to be monitored among the activated secondary cells.

Optionally, length of the PDCCH monitoring indication field is associated with a number of secondary cells or secondary cell groups configured with PDCCH.

Optionally, bit length of the PDCCH monitoring indication field is the number of secondary cells or secondary cell groups configured with PDCCH, and a value of each bit of the PDCCH monitoring indication field is used to indicate whether the PDCCH needs to be monitored on the corresponding secondary cell or secondary cell group.

Optionally, bit length of the PDCCH monitoring indication field is obtained by rounding up a logarithm of the number of secondary cells or secondary cell groups configured with PDCCH to a base 2 to an integer, and a value of the PDCCH monitoring indication field is used to indicate identifiers of the secondary cells or the secondary cell groups where PDCCH needs to be monitored.

Optionally, length of the PDCCH monitoring indication field is associated with a number of activated secondary cells or secondary cell groups configured with PDCCH.

Optionally, bit length of the PDCCH monitoring indication field is the number of activated secondary cells or secondary cell groups configured with PDCCH, and a value of each bit of the PDCCH monitoring indication field is used to indicate whether the PDCCH needs to be monitored on the corresponding activated secondary cell or secondary cell group.

Optionally, bit length of the PDCCH monitoring indication field is obtained by rounding up a logarithm of the number of activated secondary cells or secondary cell groups configured with PDCCH to a base 2 to an integer, and a value of the PDCCH monitoring indication field is used to indicate identifiers of the activated secondary cells or secondary cell groups where PDCCH needs to be monitored.

Optionally, length of the PDCCH monitoring indication field is associated with a maximum value of a number of configurable secondary cells or secondary cell groups.

Optionally, bit length of the PDCCH monitoring indication field is the maximum value of the number of configurable secondary cells or secondary cell groups, and a value of each bit of the PDCCH monitoring indication field is used to indicate whether the PDCCH needs to be monitored on the corresponding secondary cell or secondary cell group.

Optionally, bit length of the PDCCH monitoring indication field is obtained by rounding up a logarithm of the maximum value of the number of configurable secondary cells or secondary cell groups to a base 2 to an integer, and a value of the PDCCH monitoring indication field is used to indicate identifiers of activated secondary cells or secondary cell groups where PDCCH needs to be monitored.

Optionally, the method further includes: based on the received downlink control information, determining, among the activated secondary cells, secondary cells where PDCCH monitoring needs to be stopped.

Optionally, when the downlink control information is not received, the method further includes: checking whether to fall back from activated BWP to default BWP; and when falling back from the activated BWP to the default BWP, stopping monitoring the PDCCH on the activated secondary cells.

Optionally, the method further includes: when dormant state indication information is received on the specific cell, stopping monitoring the PDCCH on the activated secondary cells.

In an embodiment of the present disclosure, a UE is provided, including: a receiving circuitry configured to: after configured secondary cells are activated, receive downlink control information sent through a specific cell; a first determining circuitry configured to: based on the received downlink control information, determine, among the activated secondary cells, secondary cells where PDCCH needs to be monitored; and a monitoring circuitry configured to: monitor the PDCCH on the secondary cells where PDCCH needs to be monitored.

Optionally, the first determining circuitry is configured to: based on a PDCCH monitoring indication field preset in the received downlink control information, determine identifiers of the secondary cells where the PDCCH needs to be monitored among the activated secondary cells, or identifiers of secondary cell groups where the PDCCH needs to be monitored among the activated secondary cells.

Optionally, length of the PDCCH monitoring indication field is associated with a number of secondary cells or secondary cell groups configured with PDCCH.

Optionally, bit length of the PDCCH monitoring indication field is the number of secondary cells or secondary cell groups configured with PDCCH, and a value of each bit of the PDCCH monitoring indication field is used to indicate whether the PDCCH needs to be monitored on the corresponding secondary cell or secondary cell group.

Optionally, bit length of the PDCCH monitoring indication field is obtained by rounding up a logarithm of the number of secondary cells or secondary cell groups configured with PDCCH to a base 2 to an integer, and a value of the PDCCH monitoring indication field is used to indicate identifiers of the secondary cells or the secondary cell groups where PDCCH needs to be monitored.

Optionally, length of the PDCCH monitoring indication field is associated with a number of activated secondary cells or secondary cell groups configured with PDCCH.

Optionally, bit length of the PDCCH monitoring indication field is the number of activated secondary cells or secondary cell groups configured with PDCCH, and a value of each bit of the PDCCH monitoring indication field is used to indicate whether the PDCCH needs to be monitored on the corresponding activated secondary cell or secondary cell group.

Optionally, bit length of the PDCCH monitoring indication field is obtained by rounding up a logarithm of the number of activated secondary cells or secondary cell groups configured with PDCCH to a base 2 to an integer, and a value of the PDCCH monitoring indication field is used to indicate identifiers of the activated secondary cells or secondary cell groups where PDCCH needs to be monitored.

Optionally, length of the PDCCH monitoring indication field is associated with a maximum value of a number of configurable secondary cells or secondary cell groups.

Optionally, bit length of the PDCCH monitoring indication field is the maximum value of the number of configurable secondary cells or secondary cell groups, and a value of each bit of the PDCCH monitoring indication field is used to indicate whether the PDCCH needs to be monitored on the corresponding secondary cell or secondary cell group.

Optionally, bit length of the PDCCH monitoring indication field is obtained by rounding up a logarithm of the maximum value of the number of configurable secondary cells or secondary cell groups to a base 2 to an integer, and a value of the PDCCH monitoring indication field is used to indicate identifiers of activated secondary cells or secondary cell groups where PDCCH needs to be monitored.

Optionally, the UE further includes a second determining circuitry configured to: based on the received downlink control information, determine, among the activated secondary cells, secondary cells where PDCCH monitoring needs to be stopped.

Optionally, the UE further includes: a checking circuitry configured to: when the downlink control information is not received, check whether to fall back from activated BWP to default BWP; and a first controlling circuitry configured to: when falling back from the activated BWP to the default BWP, control the monitoring circuitry to stop monitoring the PDCCH on the activated secondary cells.

Optionally, the UE further includes a second controlling circuitry configured to: when dormant state indication information is received on the specific cell, stop monitoring the PDCCH on the activated secondary cells.

In an embodiment of the present disclosure, a computer readable storage medium having computer instructions stored therein is provided, wherein when the computer instructions are executed, any one of the above methods is performed.

In an embodiment of the present disclosure, a UE including a memory and a processor is provided, wherein the memory has computer instructions stored therein, and when the processor executes the computer instructions, any one of the above methods is performed.

Embodiments of the present disclosure may provide following advantages.

With the embodiments of the present disclosure, after the secondary cells are activated, the secondary cells where PDCCH needs to be monitored are determined among the activated secondary cells based on the received downlink control information, and then the PDCCH is monitored on the secondary cells where PDCCH needs to be monitored. As the base station can send corresponding downlink control information according to service requirements and channel conditions of the secondary cells, it can further dynamically adjust the secondary cells that schedule the UE. Compared with existing techniques where PDCCH is monitored on the secondary cells immediately after the HARQ is fed back, embodiments of the present disclosure may reduce unnecessary PDCCH monitoring on the secondary cells by the UE and further reduce power consumption of the UE.

DETAILED DESCRIPTION

In existing techniques, after a UE feeds back HARQ, PDCCH needs to be monitored on activated SCells all the time. When a base station does not deactivate the SCells in time, if a data amount is small, the base station only needs to schedule data on a specific cell. In this case, the UE still needs to monitor PDCCH on all activated SCells, which undoubtedly causes unnecessary power consumption of the UE.

In embodiments of the present disclosure, a control method for a UE is provided. After the secondary cells are activated, the secondary cells where PDCCH needs to be monitored are determined among the activated secondary cells based on the received downlink control information, and then the PDCCH is monitored on the secondary cells where PDCCH needs to be monitored. Compared with the existing techniques where PDCCH is monitored on all activated secondary cells all the time after the HARQ is fed back, embodiments of the present disclosure may reduce unnecessary PDCCH monitoring on the secondary cells by the UE and further reduce power consumption of the UE.

In order to clarify the objects, characteristics and advantages of the disclosure, embodiments of present disclosure will be described in detail in conjunction with accompanying drawings.

Figure 1:
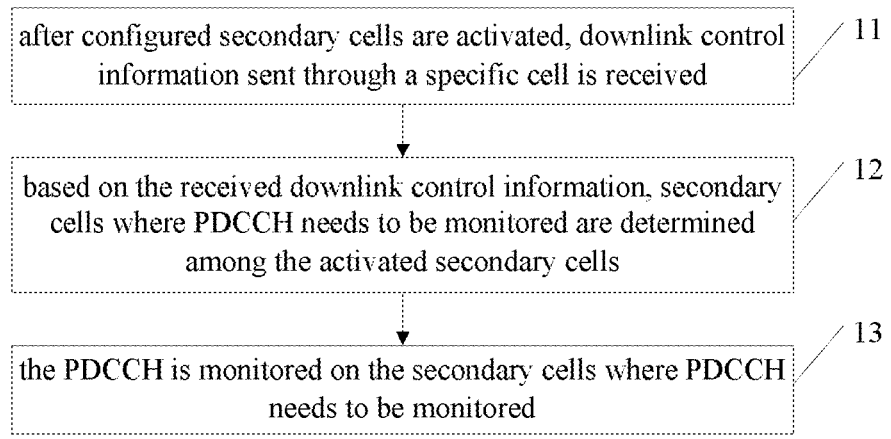
FIG. 1 is a flow chart of a control method for a UE according to an embodiment.

Referring to FIG. 1, FIG. 1 is a flow chart of a control method for a UE according to an embodiment. The method may include 11, 12 and 13.

In 11, after configured secondary cells are activated, downlink control information sent through a specific cell is received.

In some embodiments, to meet a peak rate requirement of the UE, a base station may configure one or more carrier resources for the UE to serve the UE simultaneously, so as to increase the peak rate of the UE. For example, the base station may configure a plurality of SCells for the UE, or may configure a plurality of SCell groups for the UE, where each SCell group may include one SCell or a plurality of SCells.

By default, SCells are in an inactive state. When there is a service demand, the base station may activate one or more SCells. After the configured SCells are activated, the UE may receive Downlink Control Information (DCI) sent by a specific cell (SpCell) to determine the SCells where PDCCH needs to be monitored among the activated SCells.

In some embodiments, the specific cell may include: a cell used to initiate initial access under a Master Cell Group (MCG), i.e., a Primary Cell (PCell), or a cell used to initiate connection establishment in a dual-link scenario under a Secondary Cell group (SCG), i.e., a Primary Secondary cell (PSCell).

In 12, based on the received downlink control information, secondary cells where PDCCH needs to be monitored are determined among the activated secondary cells.

In some embodiments, the base station may use various methods to set the DCI, as long as the UE can determine whether the PDCCH needs to be monitored on the corresponding SCell based on the DCI, and specifically on which SCells the PDCCH needs to be monitored.

In some embodiments, a PDCCH monitoring indication field may be preset in the DCI. After receiving the DCI, the UE may determine identifiers of the secondary cells or the secondary cell groups where PDCCH needs to be monitored among the activated secondary cells based on the PDCCH monitoring indication field preset in the received DCI. Length of the PDCCH monitoring indication field preset in the DCI is variable, and can be specifically adjusted according to actual requirements, which is not limited here.

In some embodiments, the length of the PDCCH monitoring indication field may be associated with a number N1 of SCells or SCell groups configured with PDCCH, where N1 is a positive integer.

In an embodiment, bit length L of the PDCCH monitoring indication field may be the number N1 of SCells or SCell groups configured with PDCCH, that is, L=N1, where L is a positive integer. A value of each bit of the PDCCH monitoring indication field may be used to indicate whether the PDCCH needs to be monitored on the corresponding SCell or SCell group.

In some embodiments, each bit in the PDCCH monitoring indication field may be mapped to an index value of the SCell or SCell group configured with PDCCH in an ascending or descending order. The base station may instruct the UE to start monitoring the PDCCH on the corresponding SCell or SCell in the corresponding SCell group when the corresponding bit value is 1, and instruct the UE not to monitor the PDCCH on the corresponding SCell or SCell group when the corresponding bit value is 0. Alternatively, the base station may instruct the UE not to monitor the PDCCH on the corresponding SCell or SCell in the corresponding SCell group when the corresponding bit value is 1, and instruct the UE to start monitoring the PDCCH on the corresponding SCell or SCell in the corresponding SCell group when the corresponding bit value is 0.

In some embodiments, bit length L of the PDCCH monitoring indication field may be obtained by rounding up a logarithm of a number N1 of configured SCells or SCell groups to a base 2 to an integer, i.e., $L=\lceil \log_2 N1 \rceil$. A value of the PDCCH monitoring indication field is used to indicate identifiers of the SCells or SCell groups where PDCCH needs to be monitored.

In some embodiments, the value of the PDCCH monitoring indication field may be mapped to an index value of the SCell or SCell group configured with PDCCH in an ascending or descending order.

In an embodiment, the length of the PDCCH monitoring indication field may be associated with a number N2 of activated SCells configured with PDCCH or a number N2 of activated SCell groups configured with PDCCH, where N2 is a positive integer, and N2 is less than or equal to N1.

In some embodiments, bit length L of the PDCCH monitoring indication field is a number N2 of activated SCells or SCell groups configured with PDCCH, i.e., L=N2. A value of each bit of the PDCCH monitoring indication field is used to indicate whether the PDCCH needs to be monitored on the corresponding activated secondary cell or secondary cell group.

In some embodiments, bit length L of the PDCCH monitoring indication field is obtained by rounding up a logarithm of a number N2 of activated SCells or SCell groups configured with PDCCH to a base 2 to an integer, i.e., $L=\lceil \log_2 N2 \rceil$. A value of the PDCCH monitoring indication field is used to indicate identifiers of the activated SCells or SCell groups where PDCCH needs to be monitored.

In an embodiment, length of the PDCCH monitoring indication field may be associated with a maximum value Nmax of a number of configurable SCells or SCell groups, where Nmax is a positive integer.

In some embodiments, bit length L of the PDCCH monitoring indication field is the maximum value Nmax of the number of configurable SCells or SCell groups, i.e., L=Nmax. The value of each bit of the PDCCH monitoring indication field is used to indicate whether the PDCCH needs to be monitored on the corresponding SCell or SCell group.

In some embodiments, bit length L of the PDCCH monitoring indication field is obtained by rounding up a logarithm of the maximum value Nmax of the number of configurable SCells or SCell groups to a base 2 to an integer, i.e., $L=\lceil \log_2 Nmax \rceil$. A value of the PDCCH monitoring indication field is used to indicate identifiers of the activated SCells or SCell group identifiers where PDCCH needs to be monitored.

In some embodiments, no matter L=Nmax or $L=\lceil \log_2 Nmax \rceil$, if the number of configured SCells or SCell groups N1 is less than the maximum value of the number of configurable SCells or SCell groups Nmax, i.e., N1<Nmax, bits in the PDCCH monitoring indication field that are not mapped to the SCells or SCell groups may serve as reserved bits, so that when the number of configured SCells or SCell groups changes, the reserved bits can be used to indicate whether the PDCCH needs to be monitored on the changed SCells or SCell groups.

In the below example, the maximum number of SCells that the UE can configure is Nmax, and the base station configures 4 SCells for the UE, where 4<Nmax. Index values of the configured SCells are SCell1, SCell2, SCell3, and SCell4, respectively, SCell1, SCell3 and SCell4 are configured with PDCCH, SCell2 is scheduled by SCell1, and SCell3 and SCell4 are self scheduling. SCell1, SCell 2 and SCell 3 are in an active state, and SCell4 is in an inactive state. The base station indicates whether the UE monitors the PDCCH on the activated SCells through scheduling DCI on PCell.

Assume that bit length of the PDCCH monitoring indication field preset in the DCI is L, and the number of SCells configured with PDCCH for the UE by the base station is N1, N1=3. If the bit length L of the PDCCH monitoring indication field is associated with the number of SCells configured with PDCCH, the SCells where PDCCH needs to be monitored may be determined among the activated SCells with reference to a following method.

When L=N1=3, the bit length L of the PDCCH monitoring indication field is 3. In an ascending order of index values of SCells, bits in the PDCCH monitoring indication field correspond to SCell1, SCell3 and SCell4, respectively. In an descending order of the index values of SCells, bits in the PDCCH monitoring indication field correspond to SCell4, SCell3 and SCell1, respectively. In this case, when the bit value of the PDCCH monitoring indication field is 100, taking ascending mapping as an example, the PDCCH monitoring indication field indicates that the UE monitors the PDCCH on SCell1 and does not need to monitor the PDCCH on SCell3 and SCell4.

When $L=\lceil \log_2 N1 \rceil$, the bit length L of the PDCCH monitoring indication field is 2. Taking ascending mapping as an example, if the bit value of the PDCCH monitoring indication field is 00, the PDCCH monitoring indication field indicates that the UE monitors the PDCCH on SCell1; and if the bit value of the PDCCH monitoring indication field is 01, the PDCCH monitoring indication field indicates that the UE monitors the PDCCH on SCell3.

In some embodiments, when the base station configures a plurality of SCell groups for the UE, the PDCCH monitoring indication field in the DCI may be used to indicate an index value of a SCell group. The SCells configured with PDCCH in the same SCell group have a same operation behavior, that is, start or stop monitoring at the same time or stop monitoring at the same time.

For example, the base station may use the value of each bit in the PDCCH monitoring indication field to instruct the UE to monitor the PDCCH on all activated SCells configured with PDCCH in a plurality of SCell groups, or use the value of the PDCCH monitoring indication field to instruct the UE to monitor the PDCCH on all activated SCells configured with PDCCH in the corresponding SCell group.

If the bit length L of the PDCCH monitoring indication field is associated with the number N2 of activated SCells or SCell groups configured with PDCCH, the SCells where PDCCH needs to be monitored may be determined among the activated SCells with reference to a following method.

When L=N2=2, the bit length L of the PDCCH monitoring indication field is 2. Taking the mapping in an ascending order of index values of the SCells as an example, bits in the PDCCH monitoring indication field correspond to SCell1 and SCell3, respectively. In this case, if the bit value of the PDCCH monitoring indication field in the received DCI is 01, the UE is indicated to monitor the PDCCH on SCell3, and the PDCCH on SCell1 does not need to be monitored.

When $L=\lceil \log_2 N2 \rceil$, the bit length L of the PDCCH monitoring indication field is 1. In this case, if the bit value of the PDCCH monitoring indication field in the received DCI is 00, the UE is indicated to monitor the PDCCH on SCell1, and if the bit value of the PDCCH monitoring indication field in the received DCI is 01, the UE is indicated to monitor the PDCCH on SCell3.

If the base station reactivates a new SCell and deactivates a SCell, the length and mapping of the PDCCH monitoring indication field in the DCI may be determined based on the number and index values of SCells currently in an active state.

If the bit length L of the PDCCH monitoring indication field is associated with the maximum value Nmax of the number of configurable SCells or SCell groups, the SCells where PDCCH needs to be monitored may be determined among the activated SCells with reference to a following method.

Taking Nmax=8 as an example, when L=Nmax=8, and mapping is performed in an ascending order of index values of SCells, bits in the PDCCH monitoring indication field correspond to SCell1 to SCell8, respectively. As the base station merely configures 4 SCells for the UE, and the index values are SCell1 to SCell4. Therefore, bits in the PDCCH monitoring indication field that are not mapped to the index values of SCells are reserved bits. For example, when the bits of the PDCCH monitoring indication field are S1 to S8, the four bits of S1 to S4 are valid bits, and the four bits of S5 to S8 are reserved bits. In this case, if bit values of the PDCCH monitoring indication field in the received DCI are 10000000, the UE is indicated to monitor the PDCCH on SCell1, and the PDCCH on SCell3 does not need to be monitored.

When $L=\lceil \log_2 Nmax \rceil=3$, the bit length L of the PDCCH monitoring indication field is 3. In this case, if the value of the PDCCH monitoring indication field in the received DCI is 001, the UE is indicated to monitor the PDCCH on SCell1, and if the value of the PDCCH monitoring indication field in the received DCI is 011, the UE is indicated to monitor the PDCCH on SCell3.

In 13, the PDCCH is monitored on the secondary cells where PDCCH needs to be monitored.

In some embodiments, after the SCells where PDCCH needs to be monitored are determined among the activated SCells based on the received DCI, the PDCCH may be monitored on the SCells where PDCCH needs to be monitored.

Figure 2:
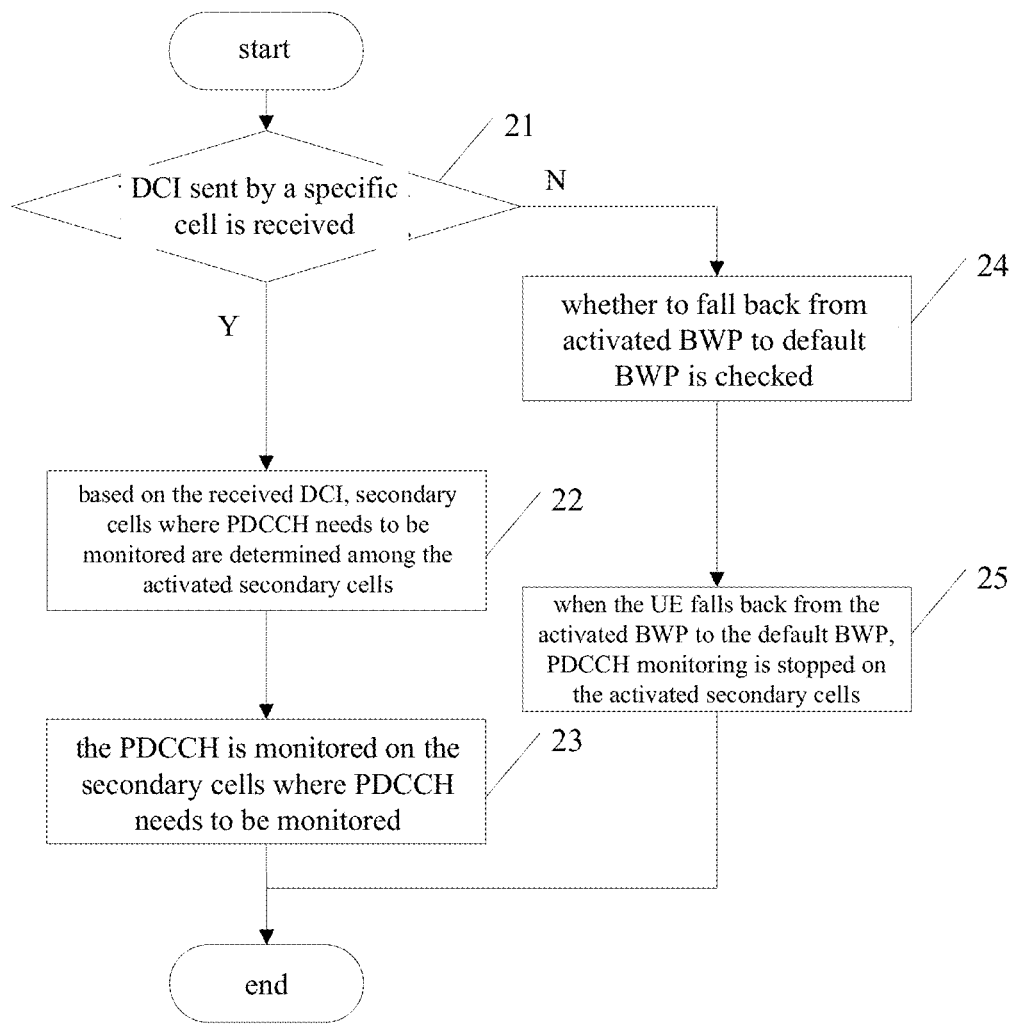
FIG. 2 is a flow chart of a control method for a UE according to an embodiment.

Referring to FIG. 2, FIG. 2 is a flow chart of a control method for a UE according to an embodiment. The method may include 21, 22, 23, 24 and 25.

In 21, after configured secondary cells are activated, whether downlink control information sent by a specific cell is received is determined.

If the downlink control information is received, 22 is performed; otherwise, 24 is performed.

In 22, based on the received downlink control information, secondary cells where PDCCH needs to be monitored are determined among the activated secondary cells.

In 23, the PDCCH is monitored on the secondary cells where PDCCH needs to be monitored.

More details about steps 21 to 23 can be referred to the above descriptions of steps 11 to 13 respectively, and are not described here.

In 24, whether to fall back from activated BWP to default BWP is checked.

In some embodiments, the UE may not receive the downlink control information due to various reasons. When the downlink control information is not received, the UE may first detect whether it needs to fall back from the activated BWP to the default BWP.

In some embodiments, the activated BWP may be BWP corresponding to the specific cell, or may be the BWP corresponding to the SCell. No matter which cell corresponds to the activated BWP, as long as the UE falls back from the activated BWP to the default BWP, 25 is performed.

In some embodiments, the base station may configure an activation timer for each BWP, and the corresponding activation timer is started when the corresponding cell has been activated and data is being transmitted and received. When the corresponding activation timer reaches a preset timing period and there is no data being transmitted or received, the UE automatically falls back from the activated BWP to the default BWP.

In 25, when the UE falls back from the activated BWP to the default BWP, PDCCH monitoring is stopped on the activated secondary cells.

In some embodiments, when the UE falls back from the activated BWP to the default BWP, it stops monitoring the PDCCH on the activated SCells where the PDCCH is being currently monitored.

In some embodiments, other methods may be used to control the UE to stop monitoring the PDCCH on the activated SCells, which is not limited here. For example, an activation or deactivation command sent by the base station may be used to stop monitoring the PDCCH on the activated SCells, or when go-to-sleep (GTS) information sent by the base station through a specific cell is received, the PDCCH monitoring is stopped on the activated SCells.

In some embodiments, the UE may determine secondary cells where PDCCH monitoring needs to be stopped among the activated secondary cells based on the received downlink control information. That is, the DCI sent by the base station through a specific cell can not only instruct the UE to start monitoring the secondary cells of PDCCH, but also instruct the UE to stop monitoring the secondary cells of PDCCH.

From above, in the control method for the UE provided in the embodiments of the present disclosure, the DCI sent by the base station on the specific cell indicates the SCells or SCells in the SCell groups where the UE starts or stops monitoring the PDCCH. As scheduling DCI requires data feedback, it may improve reliability of control. In addition, as the base station can dynamically adjust the cells in which the UE is scheduled according to service requirements, it can dynamically adapt the UE to monitor the PDCCH on the SCells or SCell groups, thereby reducing power consumption of the UE.

To enable those skilled in the art to better understand and implement embodiments of the present disclosure, the UE and the computer readable storage medium corresponding to the above method are described in detail below.

Figure 3:
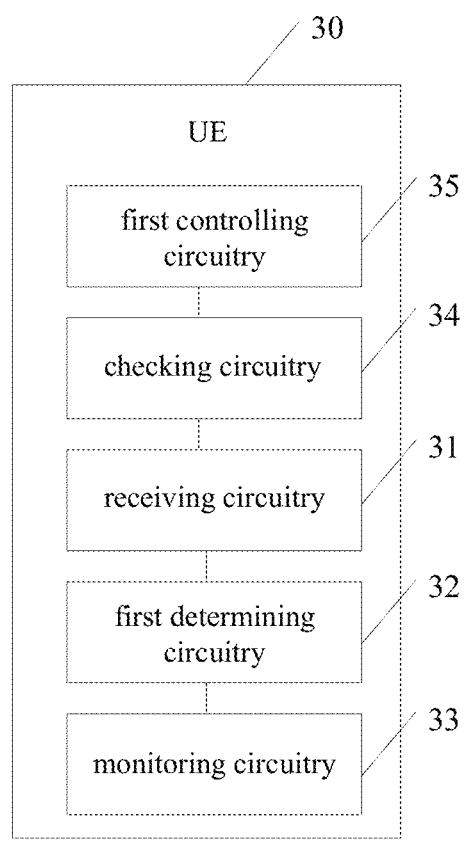
FIG. 3 is a structural diagram of a UE according to an embodiment.

FIG. 3 is a structural diagram of a UE 30 according to an embodiment. The UE 30 may include a receiving circuitry 31, a first determining circuitry 32 and a monitoring circuitry 33.

The receiving circuitry 31 is configured to: after configured secondary cells are activated, receive downlink control information sent through a specific cell. The first determining circuitry 32 is configured to: based on the received downlink control information, determine, among the activated secondary cells, secondary cells where PDCCH needs to be monitored. The monitoring circuitry 33 is configured to monitor the PDCCH on the secondary cells where PDCCH needs to be monitored.

In some embodiments, the first determining circuitry 32 is configured to: based on a PDCCH monitoring indication field preset in the received downlink control information, determine identifiers of the secondary cells where the PDCCH needs to be monitored among the activated secondary cells, or identifiers of secondary cell groups where the PDCCH needs to be monitored among the activated secondary cells.

In some embodiments, length of the PDCCH monitoring indication field is associated with a number of secondary cells or secondary cell groups configured with PDCCH.

In some embodiments, bit length of the PDCCH monitoring indication field is the number of secondary cells or secondary cell groups configured with PDCCH, and a value of each bit of the PDCCH monitoring indication field is used to indicate whether the PDCCH needs to be monitored on the corresponding secondary cell or secondary cell group.

In some embodiments, bit length of the PDCCH monitoring indication field is obtained by rounding up a logarithm of the number of secondary cells or secondary cell groups configured with PDCCH to a base 2 to an integer, and a value of the PDCCH monitoring indication field is used to indicate identifiers of the secondary cells or the secondary cell groups where PDCCH needs to be monitored.

In some embodiments, length of the PDCCH monitoring indication field is associated with a number of activated secondary cells or secondary cell groups configured with PDCCH.

In some embodiments, bit length of the PDCCH monitoring indication field is the number of activated secondary cells or secondary cell groups configured with PDCCH, and a value of each bit of the PDCCH monitoring indication field is used to indicate whether the PDCCH needs to be monitored on the corresponding activated secondary cell or secondary cell group.

In some embodiments, bit length of the PDCCH monitoring indication field is obtained by rounding up a logarithm of the number of activated secondary cells or secondary cell groups configured with PDCCH to a base 2 to an integer, and a value of the PDCCH monitoring indication field is used to indicate identifiers of the activated secondary cells or secondary cell groups where PDCCH needs to be monitored.

In some embodiments, length of the PDCCH monitoring indication field is associated with a maximum value of a number of configurable secondary cells or secondary cell groups.

In some embodiments, bit length of the PDCCH monitoring indication field is the maximum value of the number of configurable secondary cells or secondary cell groups, and a value of each bit of the PDCCH monitoring indication field is used to indicate whether the PDCCH needs to be monitored on the corresponding secondary cell or secondary cell group.

In some embodiments, bit length of the PDCCH monitoring indication field is obtained by rounding up a logarithm of the maximum value of the number of configurable secondary cells or secondary cell groups to a base 2 to an integer, and a value of the PDCCH monitoring indication field is used to indicate identifiers of activated secondary cells or secondary cell groups where PDCCH needs to be monitored.

In some embodiments, the UE 30 further includes a second determining circuitry (not shown) configured to: based on the received downlink control information, determine, among the activated secondary cells, secondary cells where PDCCH monitoring needs to be stopped.

In some embodiments, the UE 30 further includes: a checking circuitry 34 configured to: when the downlink control information is not received, check whether to fall back from activated BWP to default BWP; and a first controlling circuitry 35 configured to: when falling back from the activated BWP to the default BWP, control the monitoring circuitry to stop monitoring the PDCCH on the activated secondary cells.

In some embodiments, the UE 30 further includes a second controlling circuitry (not shown) configured to: when dormant state indication information is received on the specific cell, stop monitoring the PDCCH on the activated secondary cells.

In an embodiment of the present disclosure, a computer readable storage medium having computer instructions stored therein is provided, wherein when the computer instructions are executed, any one of the above control methods for the UE is performed.

In some embodiments, the computer readable storage medium may include a Read Only Memory (ROM), a Random Access Memory (RAM), a magnetic disk or an optical disk.

In an embodiment of the present disclosure, a UE including a memory and a processor is provided, wherein the memory has computer instructions stored therein, and when the processor executes the computer instructions, any one of the above control methods for the UE is performed.

Although the present disclosure has been disclosed above with reference to preferred embodiments thereof, it should be understood that the disclosure is presented by way of example on and not limitation. Those skilled in the art can modify and vary the embodiments without departing from the spirit and scope of the present disclosure.

What is claimed is:

1. A control method for a User Equipment (UE), comprising:
   after configured secondary cells are activated, receiving downlink control information sent through a specific cell;
   based on the received downlink control information, determining, among the activated secondary cells, secondary cells where Physical Downlink Control Channel (PDCCH) needs to be monitored; and
   monitoring the PDCCH on the secondary cells where PDCCH needs to be monitored;
   wherein based on the received downlink control information, determining, among the activated secondary cells, secondary cells where PDCCH needs to be monitored comprises:
   based on a PDCCH monitoring indication field preset in the received downlink control information, determining identifiers of the secondary cells where the PDCCH needs to be monitored among the activated secondary cells, or identifiers of secondary cell groups where the PDCCH needs to be monitored among the activated secondary cells.

2. The method according to claim 1, wherein length of the PDCCH monitoring indication field is associated with a number of secondary cells or secondary cell groups configured with PDCCH.

3. The method according to claim 2, wherein bit length of the PDCCH monitoring indication field is the number of secondary cells or secondary cell groups configured with PDCCH, and a value of each bit of the PDCCH monitoring indication field is used to indicate whether the PDCCH needs to be monitored on the corresponding secondary cell or secondary cell group.

4. The method according to claim 2, wherein bit length of the PDCCH monitoring indication field is obtained by rounding up a logarithm of the number of secondary cells or secondary cell groups configured with PDCCH to a base 2 to an integer, and a value of the PDCCH monitoring indication field is used to indicate identifiers of the secondary cells or the secondary cell groups where PDCCH needs to be monitored.

5. The method according to claim 1, wherein length of the PDCCH monitoring indication field is associated with a number of activated secondary cells or secondary cell groups configured with PDCCH.

6. The method according to claim 5, wherein bit length of the PDCCH monitoring indication field is the number of activated secondary cells or secondary cell groups configured with PDCCH, and a value of each bit of the PDCCH monitoring indication field is used to indicate whether the PDCCH needs to be monitored on the corresponding activated secondary cell or secondary cell group.

7. The method according to claim 5, wherein bit length of the PDCCH monitoring indication field is obtained by rounding up a logarithm of the number of activated secondary cells or secondary cell groups configured with PDCCH to a base 2 to an integer, and a value of the PDCCH monitoring indication field is used to indicate identifiers of the activated secondary cells or secondary cell groups where PDCCH needs to be monitored.

8. The method according to claim 1, wherein length of the PDCCH monitoring indication field is associated with a maximum value of a number of configurable secondary cells or secondary cell groups.

9. The method according to claim 8, wherein bit length of the PDCCH monitoring indication field is the maximum value of the number of configurable secondary cells or secondary cell groups, and a value of each bit of the PDCCH monitoring indication field is used to indicate whether the PDCCH needs to be monitored on the corresponding secondary cell or secondary cell group.

10. The method according to claim 8, wherein bit length of the PDCCH monitoring indication field is obtained by rounding up a logarithm of the maximum value of the number of configurable secondary cells or secondary cell groups to a base 2 to an integer, and a value of the PDCCH monitoring indication field is used to indicate identifiers of activated secondary cells or secondary cell groups where PDCCH needs to be monitored.

11. The method according to claim 1, further comprising:
    based on the received downlink control information, determining, among the activated secondary cells, secondary cells where PDCCH monitoring needs to be stopped.

12. The method according to claim 11, wherein when the downlink control information is not received, the method further comprises:
    checking whether to fall back from activated BWP to default BWP; and when falling back from the activated BWP to the default BWP, stopping monitoring the PDCCH on the activated secondary cells.

13. The method according to claim 11, wherein when the downlink control information is not received, the method further comprises:

when dormant state indication information is received on the specific cell, stopping monitoring the PDCCH on the activated secondary cells.

14. A User Equipment (UE), comprising:
a receiving circuitry configured to: after configured secondary cells are activated, receive downlink control information sent through a specific cell;
a first determining circuitry configured to: based on the received downlink control information, determine, among the activated secondary cells, secondary cells where Physical Downlink Control Channel (PDCCH) needs to be monitored; and
a monitoring circuitry configured to: monitor the PDCCH on the secondary cells where PDCCH needs to be monitored;
wherein the first determining circuitry is configured to: based on a PDCCH monitoring indication field preset in the received downlink control information, determine identifiers of the secondary cells where the PDCCH needs to be monitored among the activated secondary cells, or identifiers of secondary cell groups where the PDCCH needs to be monitored among the activated secondary cells.

15. The UE according to claim 14, wherein length of the PDCCH monitoring indication field is associated with a number of secondary cells or secondary cell groups configured with PDCCH.

16. The UE according to claim 14, wherein length of the PDCCH monitoring indication field is associated with a number of activated secondary cells or secondary cell groups configured with PDCCH.

17. A non-transitory computer readable storage medium having computer instructions stored therein, wherein when the computer instructions are executed, the method of claim 1 is performed.

18. A User Equipment (UE) comprising a memory and a processor, wherein the memory has computer instructions stored therein, and when the processor executes the computer instructions, the method of claim 1 is performed.

* * * * *